(12) United States Patent
Burmistrov et al.

(10) Patent No.: US 11,518,305 B2
(45) Date of Patent: Dec. 6, 2022

(54) TECHNIQUES FOR GENERATING VEHICLE-TO-PEDESTRIAN (V2P) COMMUNICATIONS BASED ON DRIVER MONITORING

(71) Applicant: HARMAN INTERNATIONAL INDUSTRIES, INCORPORATED, Stamford, CT (US)

(72) Inventors: Evgeny Burmistrov, Saratoga, CA (US); Joseph Verbeke, San Francisco, CA (US); Priya Seshadri, San Francisco, CA (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 22 days.

(21) Appl. No.: 17/066,431

(22) Filed: Oct. 8, 2020

(65) Prior Publication Data

US 2022/0111792 A1  Apr. 14, 2022

(51) Int. Cl.
*H04N 5/44* (2011.01)
*B60Q 9/00* (2006.01)
*B60W 40/08* (2012.01)
(Continued)

(52) U.S. Cl.
CPC .............. *B60Q 9/008* (2013.01); *B60R 21/34* (2013.01); *B60W 30/09* (2013.01);
(Continued)

(58) Field of Classification Search
CPC ........ B60Q 9/008; B60R 21/34; B60W 30/09; B60W 30/0956; B60W 40/08;
(Continued)

(56) References Cited

U.S. PATENT DOCUMENTS 8,547,249 B2 * 10/2013 David ................... G08G 1/166
340/903
10,002,536 B2 * 6/2018 Kim ..................... B60W 30/09
(Continued)

OTHER PUBLICATIONS

U.S. Appl. No. 16/810,760, filed Mar. 5, 2020, 36 pages.
U.S. Appl. No. 16/993,155, filed Aug. 13, 2020, 48 pages.
U.S. Appl. No. 16/839,056, filed Apr. 2, 2020, 44 pages.

*Primary Examiner* — Munear T Akki
(74) *Attorney, Agent, or Firm* — Artegis Law Group, LLP (57) ABSTRACT

One or more embodiments include techniques for providing an alert, based on monitoring of a driver, via a pedestrian-based vehicle-to-pedestrian (V2P) system associated with a pedestrian. A pedestrian-based V2P system receives, from a vehicle-based V2P system, data related to an awareness level of the driver of the vehicle. The data may include data specifying the awareness level of a driver with respect to a pedestrian, metrics that are determinative of the awareness level of the driver, raw measurement data from the internally facing sensors and/or externally facing sensors, alerts in digitized audio or other suitable format to transmit to the pedestrian, and/or the like. The pedestrian-based V2P system generates an alert based on at least one of a location of the vehicle and the awareness level of the driver of the vehicle. The pedestrian-based V2P system transmits the alert to an output device.

20 Claims, 8 Drawing Sheets

(51) Int. Cl.
- *B60R 21/34* (2011.01)
- *G08G 1/16* (2006.01)
- *B60W 30/09* (2012.01)
- *B60W 30/095* (2012.01)
- *B60W 60/00* (2020.01)
- *H04W 4/40* (2018.01)
- *B60W 50/14* (2020.01)

(52) U.S. Cl.
CPC ........ *B60W 30/0956* (2013.01); *B60W 40/08* (2013.01); *B60W 50/14* (2013.01); *B60W 60/0017* (2020.02); *G08G 1/166* (2013.01); *H04W 4/40* (2018.02); *B60W 2040/0818* (2013.01); *B60W 2540/229* (2020.02)

(58) Field of Classification Search
CPC ............. B60W 50/14; B60W 60/0017; B60W 2040/0818; B60W 2540/229; G08G 1/166; H04W 4/40
See application file for complete search history.

(56) References Cited

U.S. PATENT DOCUMENTS

| | | | |
|---|---|---|---|
| 10,930,142 B2* | 2/2021 | Imai | G08C 17/02 |
| 11,062,606 B2* | 7/2021 | Beauchamp | G08G 1/166 |
| 11,069,243 B2* | 7/2021 | Nordbruch | H04W 4/40 |
| 11,120,279 B2* | 9/2021 | Saez | G06K 9/6267 |
| 11,120,689 B2* | 9/2021 | Ahmad | G08G 1/166 |
| 2009/0002197 A1* | 1/2009 | Cemper | G08B 21/22 340/989 |
| 2009/0134988 A1* | 5/2009 | Nath | G08G 1/164 340/436 |
| 2010/0100324 A1* | 4/2010 | Caminiti | G08G 1/164 701/301 |
| 2011/0001635 A1* | 1/2011 | Akens | G08G 1/052 340/936 |
| 2011/0006912 A1* | 1/2011 | Sheardown | B61L 23/06 340/901 |
| 2015/0091740 A1* | 4/2015 | Bai | B60Q 9/008 340/901 |
| 2016/0063761 A1* | 3/2016 | Sisbot | G06F 3/013 345/633 |
| 2017/0028911 A1* | 2/2017 | Medenica | G08B 21/02 |
| 2018/0372864 A1* | 12/2018 | Schmidt | G01S 5/0027 |
| 2020/0047668 A1* | 2/2020 | Ueno | G08G 1/166 |
| 2020/0302795 A1* | 9/2020 | Ohrenstein | G08G 1/04 |
| 2021/0276568 A1 | 9/2021 | Verbeke et al. | |
| 2021/0309252 A1 | 10/2021 | Boulanger et al. | |
| 2021/0327260 A1* | 10/2021 | Shuman | G08G 1/0116 |
| 2022/0051567 A1 | 2/2022 | Verbeke et al. | |

* cited by examiner

TECHNIQUES FOR GENERATING VEHICLE-TO-PEDESTRIAN (V2P) COMMUNICATIONS BASED ON DRIVER MONITORING

BACKGROUND

Field of the Embodiments of the Present Disclosure

Embodiments of the present disclosure relate generally to vehicle-to-pedestrian (V2P) systems and, more specifically, to techniques for generating V2P communications based on driver monitoring.

Description of the Related Art

In everyday life, pedestrians often interact with drivers of cars, such as when a pedestrian is ensuring that a road or intersection is safe to cross. In so doing, a pedestrian may cross a road at a crosswalk when the signal light is green and signals that pedestrians may safely cross. Even under such circumstances, a driver may not notice the pedestrian due to distractions such as talking on the phone, talking to a passenger, sending a text, checking email, and/or the like. Because of these types of distractions, the pedestrian, prior to crossing the road, may attempt to look at the driver and exchange glances to ensure that the driver has seen the pedestrian. Once the pedestrian is satisfied that he or she has been noticed by the driver, the pedestrian may proceed with crossing the road.

One potential drawback with the approach described above is that the driver may not be clearly visible to the pedestrian, due to the relative orientation of the driver relative to the pedestrian, a high degree of window tinting, and/or the like. Further, the pedestrian may misinterpret a gesture or glance from the driver as an acknowledgement of the pedestrian, when the driver may be acknowledging something said by someone on a phone call or by a passenger. As a result, the pedestrian may cross the street in front of a driver who has not recognized the presence of the pedestrian, thereby putting the pedestrian in a potentially dangerous situation. Another potential drawback with the approach described above is that the pedestrian may also be distracted, due to the pedestrian listening to audio content, talking on the phone, sending a text, checking email, and/or the like. Because of these drawbacks, the driver may proceed to drive into the path of the pedestrian, and the pedestrian may not recognize the approach of the driver, thereby placing the pedestrian at risk of injury and possibly death.

As the foregoing illustrates, improved techniques for alerting a pedestrian of an awareness level of a driver would be useful.

SUMMARY

Various embodiments of the present disclosure set forth a computer-implemented method for providing an alert, based on monitoring of a driver, via a pedestrian-based V2P system associated with a pedestrian. The method includes receiving, from a vehicle-based V2P system, data related to an awareness level of the driver of the vehicle. The method further includes generating an alert based on at least one of a location of the vehicle and the awareness level of the driver of the vehicle. The method further includes transmitting the alert to an output device.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that a pedestrian is proactively alerted to the awareness level of a driver. Different levels or types of alerts inform the pedestrian as to whether the driver has an actual awareness of the pedestrian, an awareness level of the driver, or a level of distraction of the driver. The pedestrian may then take an appropriate responsive action, such as waiting before crossing the road, attempting to get the attention of the driver, taking evasive action to avoid being hit by the vehicle of the driver, and/or the like. As a result, the disclosed techniques reduce the likelihood that a pedestrian is injured by a driver relative to prior approaches. These technical advantages represent one or more technological improvements over prior art approaches.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the disclosure subsumes other embodiments as well.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

Figure 1:
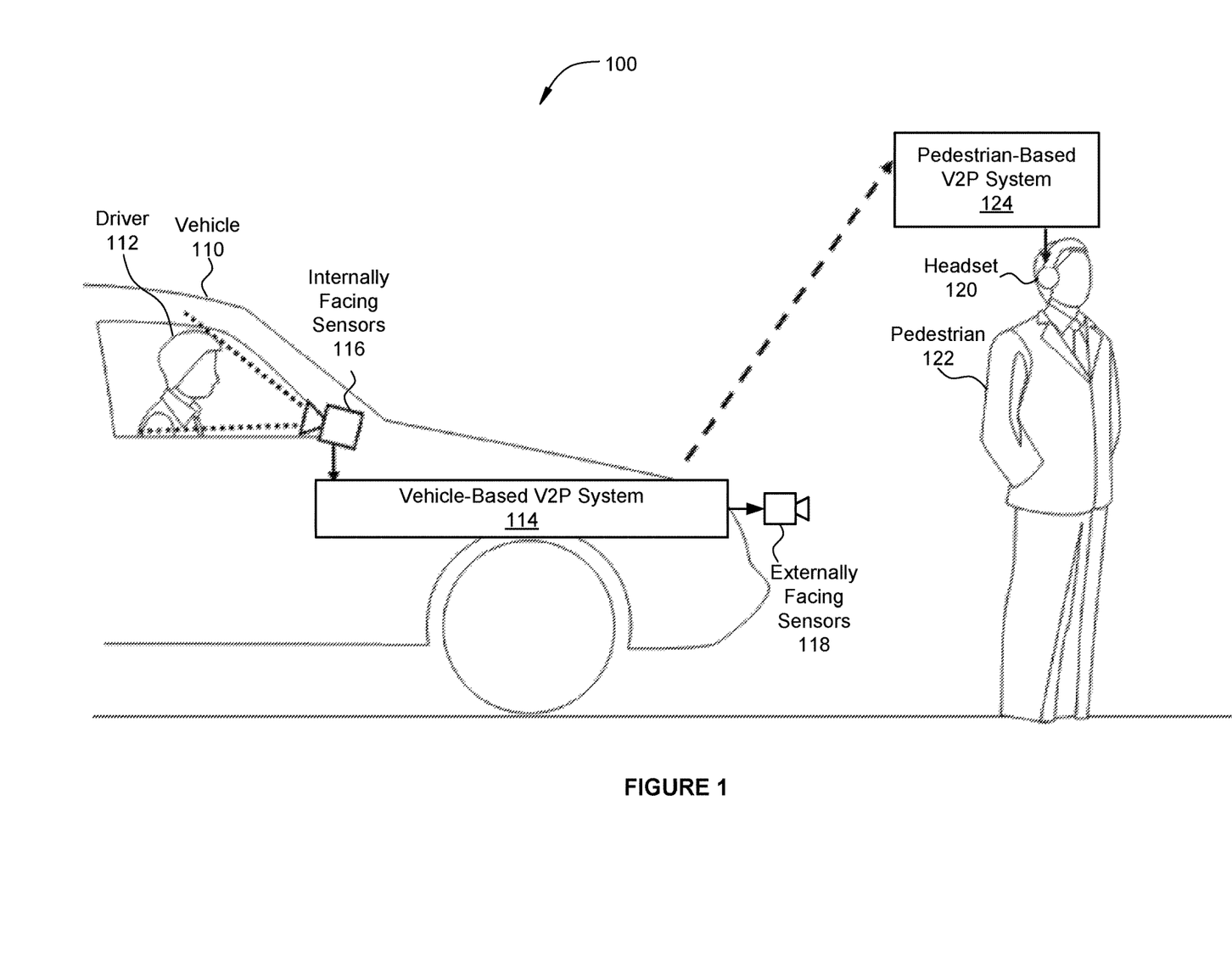
FIG. 1 illustrates a system configured to implement one or more aspects of the various embodiments.

FIG. 1 illustrates a system 100 configured to implement one or more aspects of the various embodiments. As shown, the system 100 includes, without limitation, a vehicle 110, a driver 112, a vehicle-based V2P system 114, internally facing sensors 116, externally facing sensors 118, a headset 120, a pedestrian 122, and a pedestrian-based V2P system 124.

In operation, the vehicle-based V2P system 114 determines the awareness level of the driver 112 of the vehicle 110 by measuring the driver state and intentions. The vehicle-based V2P system 114 measures the driver state and intentions via a driver monitoring system (DMS). not shown, included in the vehicle-based V2P system 114. Via the DMS, the vehicle-based V2P system 114 receives measurement data from various internally facing sensors 116. The internally facing sensors 116 include visual sensors, microphones, infrared sensors, ultrasound sensors, radar sensors, thermal imaging sensors, heartrate and breathing monitors, blood oxygenation sensors, vehicle instrument sensors, and/or the like. By analyzing the measurement data from the internally facing sensors 116, the DMS of the vehicle-based V2P system 114 determines the overall physiological state of the driver, which may include an awareness level of the driver 112 with respect to the pedestrian 122. The externally facing sensors 118 include a visual sensor, such as a camera, ultrasonic sensors, radar sensors, laser sensors, light detection and ranging (LIDAR) sensors, thermal sensors, and/or depth sensors, such as time-of-flight (TOF) sensors, structured light sensors, and/or the like. Additionally or alternatively, externally facing sensors 118 include global navigation satellite system (GNSS) receivers, global positioning system (GPS) receivers, inertial measurement units (IMUs), lidar detectors, radar detectors, infrared sensors, and/or the like. By analyzing the measurement data from the externally facing sensors 118, the vehicle-based V2P system 114 tracks the location of pedestrians, such as pedestrian 122, along with other objects within the environment. Further, the vehicle-based V2P system 114 determines the eye gaze direction of the driver 112 via the internally facing sensors 116 and either determines, via the externally facing sensors 118, or receives the location of the pedestrian 122. The vehicle-based V2P system 114 determines whether the eye gaze direction and/or the eye vergence point of the driver 112 intersects with the location of the pedestrian 122 to determine whether the driver 112 is looking at the pedestrian 122, at another portion of the road ahead, or in some other direction.

Further, the vehicle-based V2P system 114 determines the drowsiness and fatigue level of the driver 112 by measuring the opening of the eye lids of the driver 112. In some embodiments, the vehicle-based V2P system 114 includes advanced driver state classifiers for detecting whether the driver 112 is texting on their mobile device and whether the driver 112 is currently under high stress, under a high cognitive load, in a highly emotional state, and/or the like. Based on any one or more of these metrics, the vehicle-based V2P system 114 determines the awareness level of the driver 112 with respect to the pedestrian 122, along with the driver's overall capability of the driver 112 to engage in careful driving and/or to react properly to the environment outside the vehicle 110. The vehicle-based V2P system 114 transmits messages to the pedestrian-based V2P system 124. The messages may include data specifying the awareness level of the driver 112 with respect to the pedestrian 122, the metrics that are determinative of the awareness level of the driver 112, raw measurement data from the internally facing sensors 116 and/or externally facing sensors 118, alerts in digitized audio or other suitable format to transmit to the pedestrian 122, and/or the like.

The pedestrian-based V2P system 124 receives the messages from the vehicle-based V2P system 114. The pedestrian-based V2P system 124 analyzes the messages, including data specifying the awareness level of the driver 112, the metrics that are determinative of the awareness level of the driver 112, raw measurement data from the internally facing sensors 116 and/or externally facing sensors 118. Based on the analysis, the pedestrian-based V2P system 124 generates one or more alerts and transmits the alerts to the headset 120 worn by the pedestrian 122. Additionally or alternatively, the pedestrian-based V2P system 124 transmits alerts included in the messages directly to the headset 120 worn by the pedestrian 122. The alerts notify the pedestrian about the awareness level of the driver 112 of the vehicle 110. In some embodiments, one or more components of the pedestrian-based V2P system 124 may be integrated into the headset 120. In some embodiments, the pedestrian 122 may be riding or walking a personal transportation device, such as a bicycle, a scooter, a motorcycle, and/or the like. In such embodiments, the pedestrian-based V2P system 124 and/or the headset 120 may be integrated into a helmet or other protective head-worn device.

Figure 2:
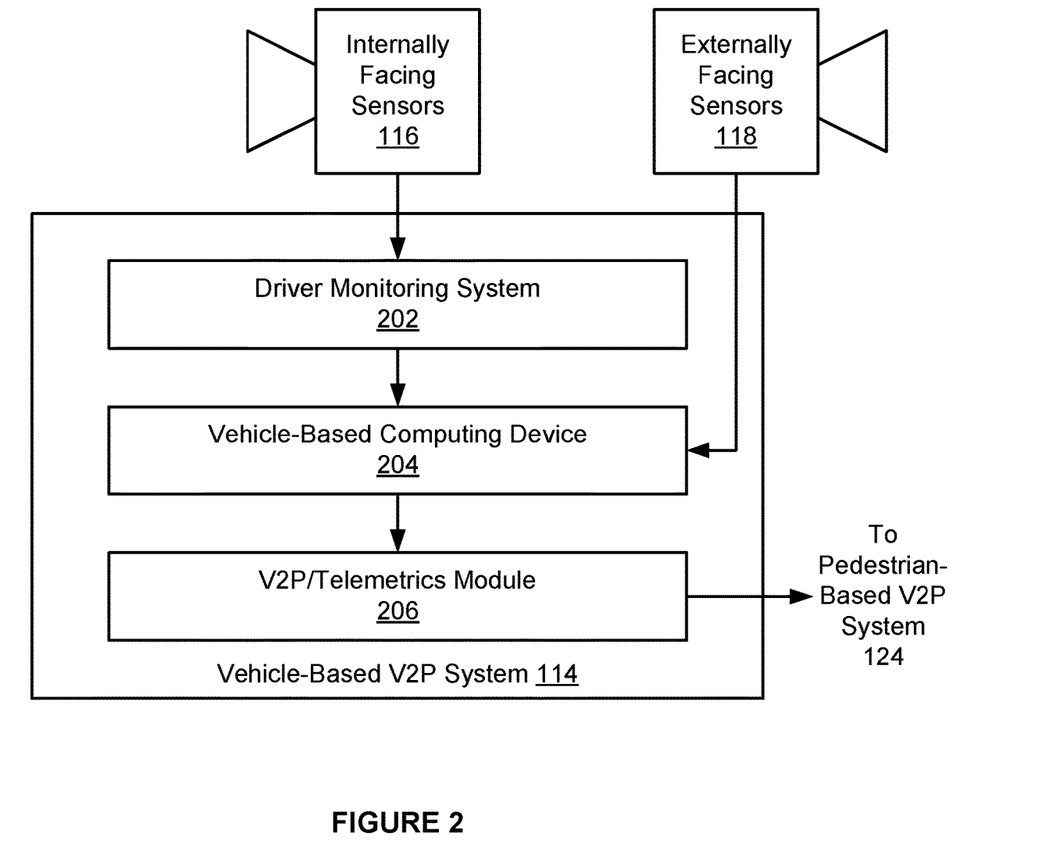
FIG. 2 illustrates a more detailed view of the vehicle-based V2P system of FIG. 1, according to various embodiments.

FIG. 2 illustrates a more detailed view of the vehicle-based V2P system 114 of FIG. 1, according to various embodiments. As shown, the vehicle-based V2P system 114 includes, without limitation, a driver monitoring system (DMS) 202, a vehicle-based V2P computing device 204, a V2P/telematics module 206.

In operation, the DMS 202 monitors a driver 112 of a vehicle 110 to determine certain characteristics, such as the alertness state of the driver 112. The DMS 202 receives measurement data via various internally facing sensors 116. By analyzing the measurement data from the internally facing sensors 116, the DMS 202 determines the overall physiological state of the driver, which may include an awareness level of the driver. If the DMS 202 determines that the driver is not sufficiently alert, the DMS 202 may initiate certain responsive actions, including, without limitation, flashing an interior light, sounding an alarm, applying brakes to slow or stop the vehicle safely, and/or the like. Further, the DMS 202 transmits measurement data received via the various sensors to the vehicle-based V2P computing device 204 for additional analysis, as further described herein.

The DMS 202 determines the awareness level of the driver 112 by determining the driver state and intentions via various techniques. In one technique, the DMS 202 determines the eye gaze direction of the driver 112 based on the location and/or orientation of the eyes of the driver 112. Based on the eye gaze direction and/or eye vergence point of the driver 112, the DMS 202 determines whether the driver 112 is looking at the road ahead or in some other direction. In another technique, the DMS 202 determines the drowsiness and fatigue level of the driver 112 via various measurement data, such as by measuring the eye lid opening of the driver 112, how often the driver 112 closes his or her eyes, and/or the like. In yet another technique, the DMS 202 determines whether the driver 112 is engaging in certain distracting behaviors, such as listening to audio content, talking on the phone, sending a text, checking email, and/or the like. In yet another technique, the DMS 202 detects whether the driver 112 is under high stress, whether the driver 112 is experiencing high cognitive load, whether the driver 112 is in a highly emotional state, and/or the like. In some embodiments, the DMS 202 may determine whether the driver 112 is experiencing high cognitive load based on an eye motions, heart rate variability, an index of cognitive activity (ICA) derived from pupillometry data, and/or the like. Pupillometry data includes measurements of the change in pupil diameter, measurements of eye motions, and/or the like. In some embodiments, the DMS 202 may determine whether the driver 112 is in a highly emotional or high arousal state by determining an emotional arousal level (low arousal versus high arousal), an emotional valence (negative valence emotions versus positive valence emotions), and/or the like. In yet another technique, the DMS 202 may determine whether the driver 112 has consciously seen a pedestrian via pupil frequency tagging. In such embodiments, the DMS 202 determines whether the driver 112 is looking at a particular object that exhibits some type of luminosity change at a certain frequency. Via various sensors, the DMS 202 detects a luminosity change of a reflection off the pupil of the driver 112 derived from the luminosity of the object being viewed. Based on the luminosity change, the DMS 202 determines that the driver has observed the object. The DMS 202 transmits data associated with the eye gaze direction, fatigue, behavior, stress, cognitive load, and/or emotional state of the driver 112 to the vehicle-based V2P computing device 204. Additionally or alternatively, the DMS 202 transmits raw measurement data from the internally facing sensors 116 to the vehicle-based V2P computing device 204.

In operation, the externally facing sensors 118 transmit additional measurement data to the vehicle-based V2P computing device 204, including environmental data, location of the vehicle 110, and locations of pedestrians and other objects external to the vehicle 110. Additionally or alternatively, the V2P/telematics module 206 determines the locations of pedestrians and other objects external to the vehicle 110.

In operation, the vehicle-based V2P computing device 204 performs any one or more of the techniques associated with the vehicle-based V2P system 114, as described herein. The vehicle-based V2P computing device 204 receives data from the DMS 202 and from the externally facing sensors 118. The vehicle-based V2P computing device 204 further receives data from the V2P/telematics module 206 regarding the locations of pedestrians and other objects external to the vehicle 110. Based on the received data, the vehicle-based V2P computing device 204 determines an awareness level of the driver 112 relative to the pedestrian 122. If a pedestrian 122 is in proximity of the vehicle 110, the vehicle-based V2P computing device 204 transmits data to the V2P/telematics module 206 for transmission to the pedestrian-based V2P system 124. The data may include data specifying the awareness level of the driver 112, the metrics that are determinative of the awareness level of the driver 112, raw measurement data from the internally facing sensors 116 and/or externally facing sensors 118, and/or the like.

Additionally or alternatively, the vehicle-based V2P computing device 204 generates one or more alerts in digitized audio or other suitable format to transmit to the pedestrian 122. In some embodiments, the vehicle-based V2P computing device 204 generates alerts that indicate one of a number of possible awareness levels of the driver 112. The alerts may indicate one of three possible awareness levels. Additionally or alternatively, the alerts may indicate one of any number of possible awareness levels, such as five, seven, ten, and/or the like. Additionally or alternatively, the alerts may indicate a percentage of awareness that varies from 0% to 100%. The percentage of awareness may be expressed in any resolution of increment, such as tens of percent, single percent, tenths of a percent, and/or the like. Additionally or alternatively, the alerts may include digitized synthetic speech or recorded speech indicating the nature of the alert. Such alerts may include statements such as "The driver is texting!" if the vehicle-based V2P computing device 204 determines that the driver 112 is currently composing a text on a mobile phone. Similarly, such alerts may include statements such as "The driver's attention is not focused on you!" if the vehicle-based V2P computing device 204 determines that the driver 112 is attempting to read something from the infotainment display in the vehicle 110 and is not paying attention to the pedestrians 122.

In a particular embodiment, the vehicle-based V2P computing device 204 generates three alert levels, corresponding to a high awareness level, medium awareness level, or low awareness level of the driver 112. The vehicle-based V2P computing device 204, via the DMS 202, may determine that the driver 112 has looked in the direction of the pedestrian 122, based on whether the eye gaze direction and/or the eye vergence point of the driver 112 intersects with the location of the pedestrian 122 and/or whether the driver 112 appears to have made eye-contact with the pedestrian 122. As a result, the vehicle-based V2P computing device 204 may determine that the driver 112 has a high awareness level with respect to the pedestrian 122. Alternatively, the vehicle-based V2P computing device 204, via the DMS 202, may determine that the driver 112 has not looked in the direction of the pedestrian 122 but, nevertheless, the driver is not exhibiting any symptoms of distracted driving, and/or the driver 112 has stopped, or is in the process of stopping, the vehicle 110 near the crosswalk. As a result, the vehicle-based V2P computing device 204 may determine that the driver 112 has a medium awareness level with respect to the pedestrian 122. Alternatively, the vehicle-based V2P computing device 204, via the DMS 202, may determine that the driver 112 is engaged in distracted driving due to driver fatigue, texting, and/or the like. As a result, the vehicle-based V2P computing device 204 may determine that the driver 112 has a low awareness level with respect to the pedestrian 122. Based on the determined awareness level of the driver 112, the vehicle-based V2P computing device 204 generates a corresponding alert.

In some embodiments, the vehicle 110 may be partially or fully autonomous. In such embodiments, the alert may be further based on the autonomy level of the vehicle 110 and whether the vehicle 110 is operating under fully autonomous mode, under partially autonomous mode, or under manual control of the driver 112. The vehicle-based V2P computing device 204 may transmit data and/or alerts that identify the maximum autonomy of the vehicle, the currently operating autonomy level of the vehicle, and/or like. The vehicle-based V2P computing device 204 may transmit data and/or alerts that further identify autonomous actions being taken by the vehicle 110. In one example, the vehicle-based V2P computing device 204 may transmit data and/or alerts that indicate that the driver 112 has a low awareness level, but the vehicle 110 is under autonomous control and is braking or taking some other evasive action to avoid hitting the pedestrian 122. In another example, the pedestrian-based V2P computing device 406 may transmit data and/or alerts that indicate that the driver 112 has a medium awareness level and that the autonomous vehicle is currently under manual control of the driver 112, so the autonomous vehicle is not taking any action.

In operation, the V2P/telematics module 206 determines whether one or more pedestrians are in proximity of the vehicle 110. The V2P/telematics module 206 receives the location of the pedestrian 122 from the V2P module 402 of the pedestrian-based V2P system 124 and transmits the locations of such pedestrians to the vehicle-based V2P computing device 204. In addition, the V2P/telematics module 206 receives data from the vehicle-based V2P computing device 204 and transmits the data in the form of messages to the V2P module 402 of the pedestrian-based V2P system 124. The data may include data specifying the awareness level of the driver 112, the metrics that are determinative of the awareness level of the driver 112, raw measurement data from the internally facing sensors 116 and/or externally facing sensors 118, alerts in digitized audio or other suitable format to transmit to the pedestrian 122, and/or the like.

The V2P/telematics module 206 exchanges messages with the V2P module 402 of the pedestrian-based V2P system 124 via any technically feasible communications protocol, including Wave messages via a peer-to-peer protocol over 802.11p, Bluetooth, 3GPP Cellular V2X (C-V2X), and/or the like. In general, the V2P/telematics module 206 exchanges messages via any wireless low-power point-to-point communication protocol between the vehicle-based V2P system 114 and other entities, such as the pedestrian-based V2P system 124. The V2P/telematics module 206 communicates with the V2P module 402 of the pedestrian-based V2P system 124 when the distance between the V2P/telematics module 206 and the V2P module 402 are within a threshold range of each other, such as within a few tens of meters.

Figure 3:
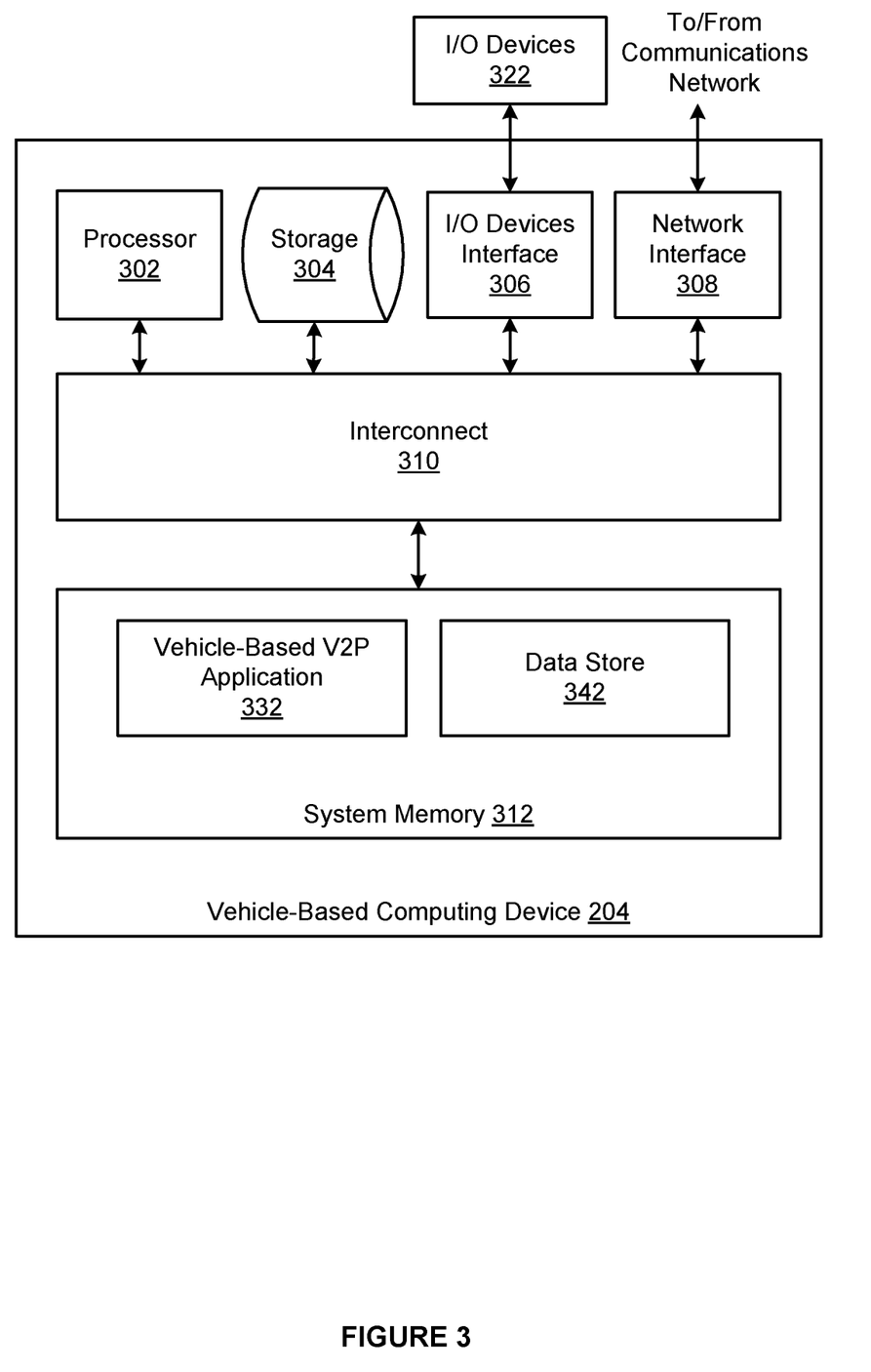
FIG. 3 is a block diagram of the vehicle-based computing device that may be implemented in conjunction with or coupled to the vehicle-based V2P system of FIGS. 1-2, according to various embodiments.

FIG. 3 is a block diagram of the vehicle-based V2P computing device 204 that may be implemented in conjunction with or coupled to the vehicle-based V2P system 114 of FIGS. 1-2, according to various embodiments. As shown, the vehicle-based V2P computing device 204 includes, without limitation, a processor 302, storage 304, an input/output (I/O) devices interface 306, a network interface 308, an interconnect 310, and a system memory 312.

The processor 302 retrieves and executes programming instructions stored in the system memory 312. Similarly, the processor 302 stores and retrieves application data residing in the system memory 312. The interconnect 310 facilitates transmission, such as of programming instructions and application data, between the processor 302, I/O devices interface 306, storage 304, network interface 308, and system memory 312. The I/O devices interface 306 is configured to receive input data from user I/O devices 322. Examples of user I/O devices 322 may include one or more buttons, a keyboard, a mouse or other pointing device, and/or the like. The I/O devices interface 306 may also include an audio output unit configured to generate an electrical audio output signal, and user I/O devices 322 may further include a speaker configured to generate an acoustic output in response to the electrical audio output signal. Another example of a user I/O device 322 is a display device that generally represents any technically feasible means for generating an image for display. For example, the display device could be a liquid crystal display (LCD) display, organic light-emitting diode (OLED) display, or digital light processing (DLP) display. The display device may be a TV that includes a broadcast or cable tuner for receiving digital or analog television signals. The display device may be included in a head-mounted display (HMD) assembly such as a VR/AR headset or a heads-up display (HUD) assembly. Further, the display device may project an image onto one or more surfaces, such as walls, projection screens, a windshield of a vehicle, and/or the like. Additionally or alternatively, the display device may project an image directly onto the eyes of a user (e.g., via retinal projection).

Processor 302 is included to be representative of a single central processing unit (CPU), multiple CPUs, a single CPU having multiple processing cores, digital signal processors (DSPs), field-programmable gate arrays (FPGAs), graphics processing units (GPUs), tensor processing units, and/or the like. And the system memory 312 is generally included to be representative of a random access memory. The storage 304 may be a disk drive storage device. Although shown as a single unit, the storage 304 may be a combination of fixed and/or removable storage devices, such as fixed disc drives, floppy disc drives, tape drives, removable memory cards, or optical storage, network attached storage (NAS), or a storage area-network (SAN). Processor 302 communicates to other computing devices and systems via network interface 308, where network interface 308 is configured to transmit and receive data via a communications network.

The system memory 312 includes, without limitation, a vehicle-based V2P application 332 and a data store 342. The vehicle-based V2P application 332, when executed by the processor 302, performs one or more operations associated with the vehicle-based V2P computing device 204 of FIGS. 2-3, as further described herein. When performing the operations associated with the vehicle-based V2P computing device 204, the vehicle-based V2P application 332 may store data in and retrieve data from data store 342.

Figure 4:
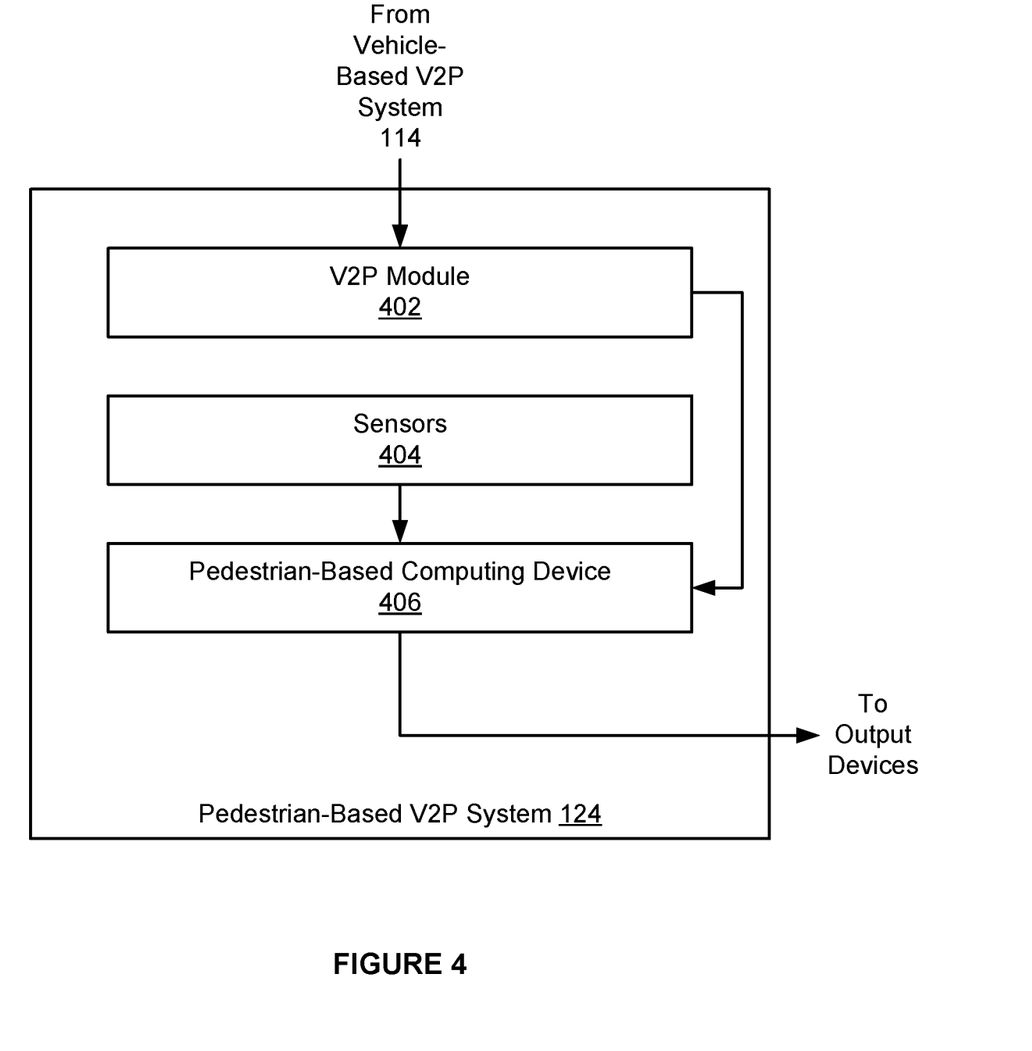
FIG. 4 illustrates a more detailed view of the pedestrian-based V2P system of FIG. 1, according to various embodiments.

FIG. 4 illustrates a more detailed view of the pedestrian-based V2P system 124 of FIG. 1, according to various embodiments. As shown, the pedestrian-based V2P system 124 includes, without limitation, a V2P module 402, sensors 404, and a pedestrian-based V2P computing device 406.

In operation, the V2P module 402 performs two functions. In a first function, the V2P module 402 transmits messages that include the location of the pedestrian 122 to the V2P/telematics module 206, where the location includes an absolute location of the pedestrian 122 or as a location of the pedestrian 122 relative to the vehicle 110. In a second function, the V2P module 402 receives data in the form of messages from the V2P/telematics module 206 of the vehicle-based V2P computing device 204 and transmits the data to the pedestrian-based V2P computing device 406. The data may include data specifying the awareness level of the driver 112, the metrics that are determinative of the awareness level of the driver 112, raw measurement data from the internally facing sensors 116 and/or externally facing sensors 118, alerts in digitized audio or other suitable format to transmit to the pedestrian 122, and/or the like.

The V2P module 402 exchanges messages with the V2P/telematics module 206 of the vehicle-based V2P system 114 via any technically feasible communications protocol, including Wave messages via a peer-to-peer protocol over 802.11p, Bluetooth, 3GPP Cellular V2X (C-V2X), and/or the like. In general, the V2P module 402 exchanges messages via any wireless low-power point-to-point communication protocol between pedestrian-based V2P system 124 and other entities, such as the vehicle-based V2P system 114. The V2P module 402 communicates with the V2P/telematics module 206 of the vehicle-based V2P system 114 when the distance between the V2P module 402 and the V2P/telematics module 206 are within a threshold range of each other, such as within a few tens of meters.

In operation, the sensors 404 detect the location of the headset 120 worn by the pedestrian 122. The sensors transmit the location of the headset 120 to the pedestrian-based V2P computing device 406. The sensors 404 include global navigation satellite system (GNSS) receivers, global positioning system (GPS) receivers, inertial measurement units (IMUs), lidar detectors, radar detectors, infrared sensors, and/or the like.

In operation, the pedestrian-based V2P computing device 406 performs any one or more of the techniques associated with the pedestrian-based V2P system 124, as described herein. The pedestrian-based V2P computing device 406 receives data from the sensors 404 identifying the location of the headset 120 worn by the pedestrian 122. The pedestrian-based V2P computing device 406 transmits data identifying the location of the headset 120 to the V2P module 402. The V2P module 402, in turn, transmits the data to the V2P/telematics module 206 of the vehicle-based V2P system 114.

Further, the pedestrian-based V2P computing device 406 receives data from the V2P module 402 that includes data received from the V2P/telematics module 206 of the vehicle-based V2P system 114. The data may include data specifying the awareness level of the driver 112, the metrics that are determinative of the awareness level of the driver 112, raw measurement data from the internally facing sensors 116 and/or externally facing sensors 118, alerts in digitized audio or other suitable format to transmit to the pedestrian 122, and/or the like. In some embodiments, the pedestrian-based V2P computing device 406 may analyze the data in order to generate one or more alerts, as described herein in conjunction with the vehicle-based V2P computing device 204 of FIG. 2, to transmit to the pedestrian 122. Additionally or alternatively, the pedestrian-based V2P computing device 406 may receive alerts from the vehicle-based V2P system 114 and transmit the alerts to the pedestrian 122. In general, the alerts warn the pedestrian 122 of a nearby vehicle 110. If the data received from the V2P module 402 includes one or more alerts, then the pedestrian-based V2P computing device 406 transmits the alert directly to the pedestrian 122.

The alerts may be in any technically feasible format. In some embodiments, an alert may include voice alerts that indicate an awareness level of the driver. A voice alert indicating a high awareness level may state, "The driver of the yellow vehicle on your left has likely seen you. You may proceed." A voice alert indicating a medium awareness level may state, "The driver of the yellow vehicle on your left has not yet seen you. You may proceed with caution." A voice alert indicating a low awareness level may state, "The driver of the yellow vehicle on your left is distracted and has not seen you. Do not proceed." In some embodiments, the alert may include audio directional cues, whereby the pedestrian 122 perceives the voice alerts as coming from a particular direction, such as the direction of the vehicle 110.

In some embodiments, an alert may include audible cues that indicate an awareness level of the driver 112. The audio cues may be in the form of a series of beeps, chimes, and/or the like. The number, intensity, and frequency of the audio cues may vary with the awareness level of the driver 112. If there are three awareness levels, then a single beep, a double beep, or a triple beep may indicate that the driver 112 has a high awareness level, a medium awareness level, or a low awareness level, respectively. In some embodiments, the alert may include audio directional cues, whereby the pedestrian 122 perceives the audio cues as coming from a particular direction, such as the direction of the vehicle 110.

In some embodiments, an alert may include synthetic vehicle sounds that appear to be coming from the direction of the vehicle 110. The volume of the synthetic vehicle sounds may vary, such that the volume increases as the level of alertness of the driver 112 decreases.

In some embodiments, an alert may include one or more haptic outputs perceived by the pedestrian 112 as physical pressure, vibrations, and/or the like. The haptic outputs indicate an awareness level of the driver 112. The haptic outputs may be in the form of a series of pulses, vibrations, and/or the like. The number, intensity, and frequency of the haptic outputs may vary with the awareness level of the driver 112. If there are three awareness levels, then a single pulse, a double pulse, or a triple pulse may indicate that the driver 112 has a high awareness level, a medium awareness level, or a low awareness level, respectively. In some embodiments, the alert may include haptic directional cues, whereby different portions of the headset 120 generate haptic outputs based on the haptic directional clues. As a result, the pedestrian 122 perceives the haptic outputs as coming from a particular direction, such as the direction of the vehicle 110.

In some embodiments, the pedestrian-based V2P system 124 may be integrated into an augmented reality (AR) headset or other device with a visual display. In such embodiments, an alert may include a visual image or animation that is displayed to the pedestrian 122 via the visual display of the AR headset or other device.

As described herein, the pedestrian-based V2P computing device 406 determines whether to generate an alert based on the awareness level of the driver 112 and when the vehicle 110 and the pedestrian 122 are within a certain distance range from one another. In some embodiments, the pedestrian-based V2P computing device 406 further determines whether to generate an alert based on the behavior of the pedestrian 122. Based on data received from the sensors 404, the pedestrian-based V2P computing device 406 may determine that the pedestrian is standing on the curb near a crosswalk. As a result, the pedestrian-based V2P computing device 406 may generate an alert based on the awareness level of the driver 112, as described herein. On the other hand, the pedestrian-based V2P computing device 406 may determine that the pedestrian 122 is walking along a sidewalk, the pedestrian 122 is not close to an intersection or crosswalk, the pedestrian 122 is sitting on a bench, and/or the like. As a result, the pedestrian-based V2P computing device 406 may determine that no alerts are to be generated regardless of the awareness level of the driver 112.

In some embodiments, the pedestrian-based V2P computing device 406 may determine, via the sensors 404, that the vehicle 110 is in proximity of the pedestrian 122. The pedestrian-based V2P computing device 406 may further determine, via the V2P module 402, that no V2P communications channel has been establish with the V2P/telematics module 206 of the vehicle-based V2P computing device 204. As a result, the pedestrian-based V2P computing device 406 may generate an alert indicating that the awareness level of the driver 112 is unknown.

Figure 5:
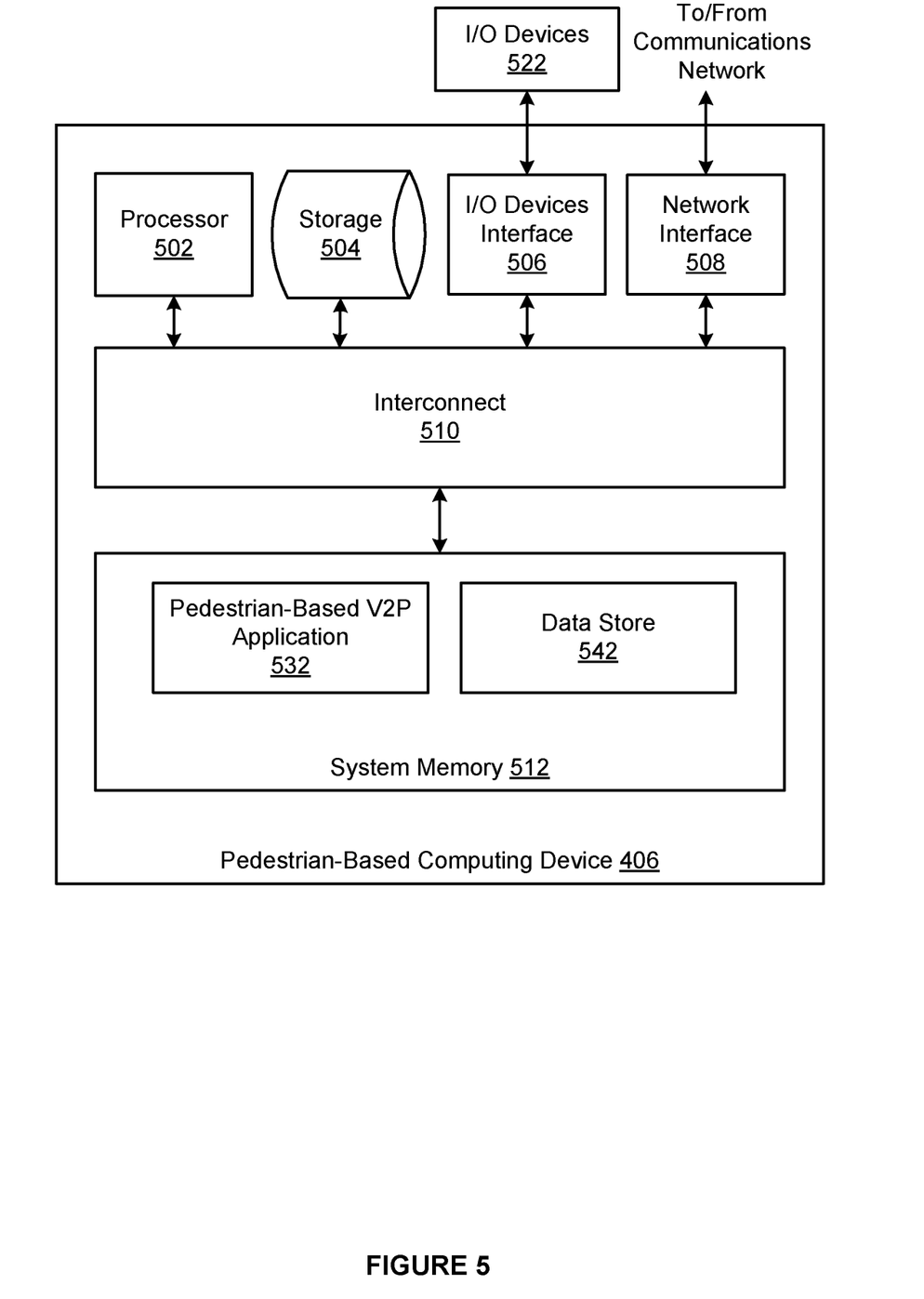
FIG. 5 is a block diagram of the pedestrian-based computing device that may be implemented in conjunction with or coupled to the pedestrian-based V2P system of FIGS. 1 and 4, according to various embodiments.

FIG. 5 is a block diagram of the pedestrian-based V2P computing device 406 that may be implemented in conjunction with or coupled to the pedestrian-based V2P system 124 of FIGS. 1 and 4, according to various embodiments. As shown, the pedestrian-based V2P computing device 406 includes, without limitation, a processor 502, storage 504, an input/output (I/O) devices interface 506, a network interface 508, an interconnect 510, and a system memory 512.

The processor 502 retrieves and executes programming instructions stored in the system memory 512. Similarly, the processor 502 stores and retrieves application data residing in the system memory 512. The interconnect 510 facilitates transmission, such as of programming instructions and application data, between the processor 502, I/O devices interface 506, storage 504, network interface 508, and system memory 512. The I/O devices interface 506 is configured to receive input data from user I/O devices 522. Examples of user I/O devices 522 may include one or more buttons, a keyboard, a mouse or other pointing device, and/or the like. The I/O devices interface 506 may also include an audio output unit configured to generate an electrical audio output signal, and user I/O devices 522 may further include a speaker configured to generate an acoustic output in response to the electrical audio output signal. Another example of a user I/O device 522 is a display device that generally represents any technically feasible means for generating an image for display. For example, the display device could be a liquid crystal display (LCD) display, organic light-emitting diode (OLED) display, or digital light processing (DLP) display. The display device may include a broadcast or cable tuner for receiving digital or analog television signals. The display device may be included in a head-mounted display (HMD) assembly such as a VR/AR headset or a heads-up display (HUD) assembly. Further, the display device may project an image onto one or more surfaces, such as walls, projection screens, a surface included in the HMD assembly, and/or the like. Additionally or alternatively, the display device may project an image directly onto the eyes of a user (e.g. via retinal projection).

In some embodiments, the display device included in the pedestrian-based V2P computing device 406 may project visual information in the form of images onto one or more vehicles, such as vehicle 110. Such visual information may provide additional information to the pedestrian 122 as to which vehicles pose a potential hazard to the pedestrian 122. Such visual information may be readily seen by the pedestrian 122, particularly at night. In one example, the visual information may be in the form of colored indicator, such as a color field, a narrow or broad beam of light, and/or the like, projected onto the surface of the vehicle 110. If the driver 112 has a high awareness level of the pedestrian 122, then the display device may project a green colored indicator onto a surface of the vehicle 110. If the driver 112 has a medium awareness level of the pedestrian 122, then the display device may project a yellow or orange colored indicator onto a surface of the vehicle 110. If the driver 112 has a low awareness level of the pedestrian 122, then the display device may project a red colored indicator onto a surface of the vehicle 110. In another example, the display device may project text and/or icons onto a surface of the vehicle 110 that indicate the awareness level of the driver 112 and/or other state information related to the driver 112. In this manner, the pedestrian 122 may quickly determine which vehicles poses a high, medium, or low risk to the pedestrian 122.

Processor 502 is included to be representative of a single central processing unit (CPU), multiple CPUs, a single CPU having multiple processing cores, digital signal processors (DSPs), field-programmable gate arrays (FPGAs), graphics processing units (GPUs), tensor processing units, and/or the like. And the system memory 512 is generally included to be representative of a random access memory. The storage 504 may be a disk drive storage device. Although shown as a single unit, the storage 504 may be a combination of fixed and/or removable storage devices, such as fixed disc drives, floppy disc drives, tape drives, removable memory cards, or optical storage, network attached storage (NAS), or a storage area-network (SAN). Processor 502 communicates to other computing devices and systems via network interface 508, where network interface 508 is configured to transmit and receive data via a communications network.

The system memory 512 includes, without limitation, a pedestrian-based V2P application 532 and a data store 542. The pedestrian-based V2P application 532, when executed by the processor 502, performs one or more operations associated with the pedestrian-based V2P computing device 406 of FIGS. 4-5, as further described herein. When performing the operations associated with the pedestrian-based V2P computing device 406, the pedestrian-based V2P application 532 may store data in and retrieve data from data store 542.

Figure 6:
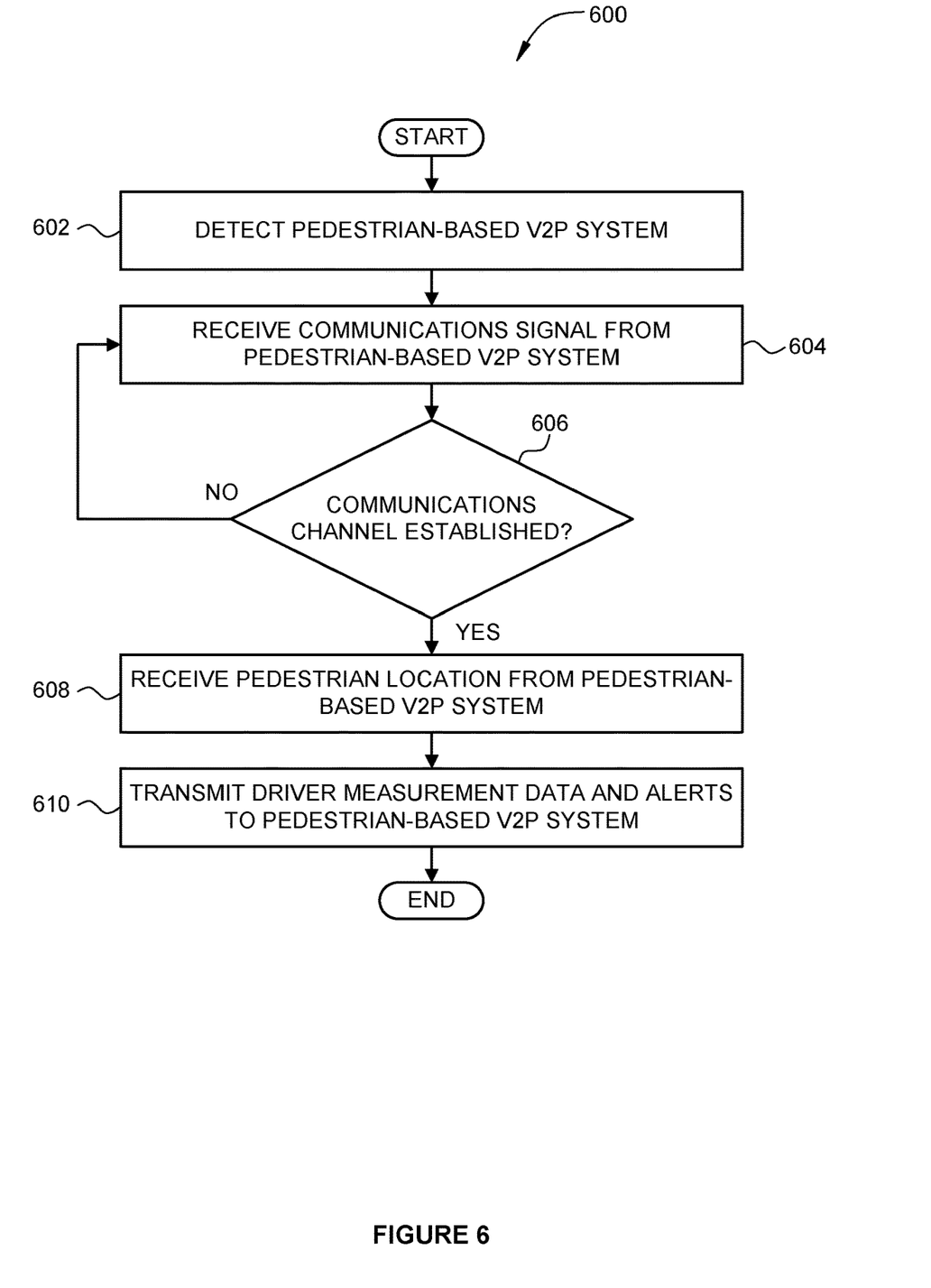
FIG. 6 is a flow diagram of method steps for transmitting, via a vehicle-based V2P system, measurement data and alerts associated with monitoring of a driver to a pedestrian-based V2P system associated with a pedestrian, according to various embodiments.

FIG. 6 is a flow diagram of method steps for transmitting, via a vehicle-based V2P system, measurement data and alerts associated with monitoring of a driver 112 to a pedestrian-based V2P system 124 associated with a pedestrian 122, according to various embodiments. Although the method steps are described in conjunction with the systems of FIGS. 1-5, persons skilled in the art will understand that any system configured to perform the method steps, in any order, is within the scope of the present disclosure.

As shown, a method 600 begins at step 602, where a vehicle-based V2P system 114 detects a pedestrian-based V2P system 124. At step 604, the vehicle-based V2P system 114 receives a communications signal from the pedestrian-based V2P system 124 to establish a communications channel between the vehicle-based V2P system 114 and the pedestrian-based V2P system 124. The communications signal may be compatible with any technically feasible communications protocol, including Wave messages via a peer-to-peer protocol over 802.11p, Bluetooth, 3GPP Cellular V2X (C-V2X), and/or any wireless low-power point-to-point communication protocol. At step 606, the vehicle-based V2P system 114 determines whether the communications channel has been established. If the communications channel has not been established, then the method 600 proceeds to step 604, described above.

If, on the other hand, the communications channel has been established, then the method 600 proceeds to step 608, where the vehicle-based V2P system 114 receives the location of the pedestrian 122 from the pedestrian-based V2P system 124. At step 610, the vehicle-based V2P system 114 transmits measurement data and/or alerts related to the awareness level of the driver 112 to the pedestrian-based V2P system 124. The data may include data specifying the awareness level of the driver 112, metrics that are determinative of the awareness level of the driver 112, raw measurement data from the internally facing sensors 116 and/or externally facing sensors 118, alerts in digitized audio or other suitable format to transmit to the pedestrian 122, and/or the like. The method 600 then terminates.

Figure 7A:
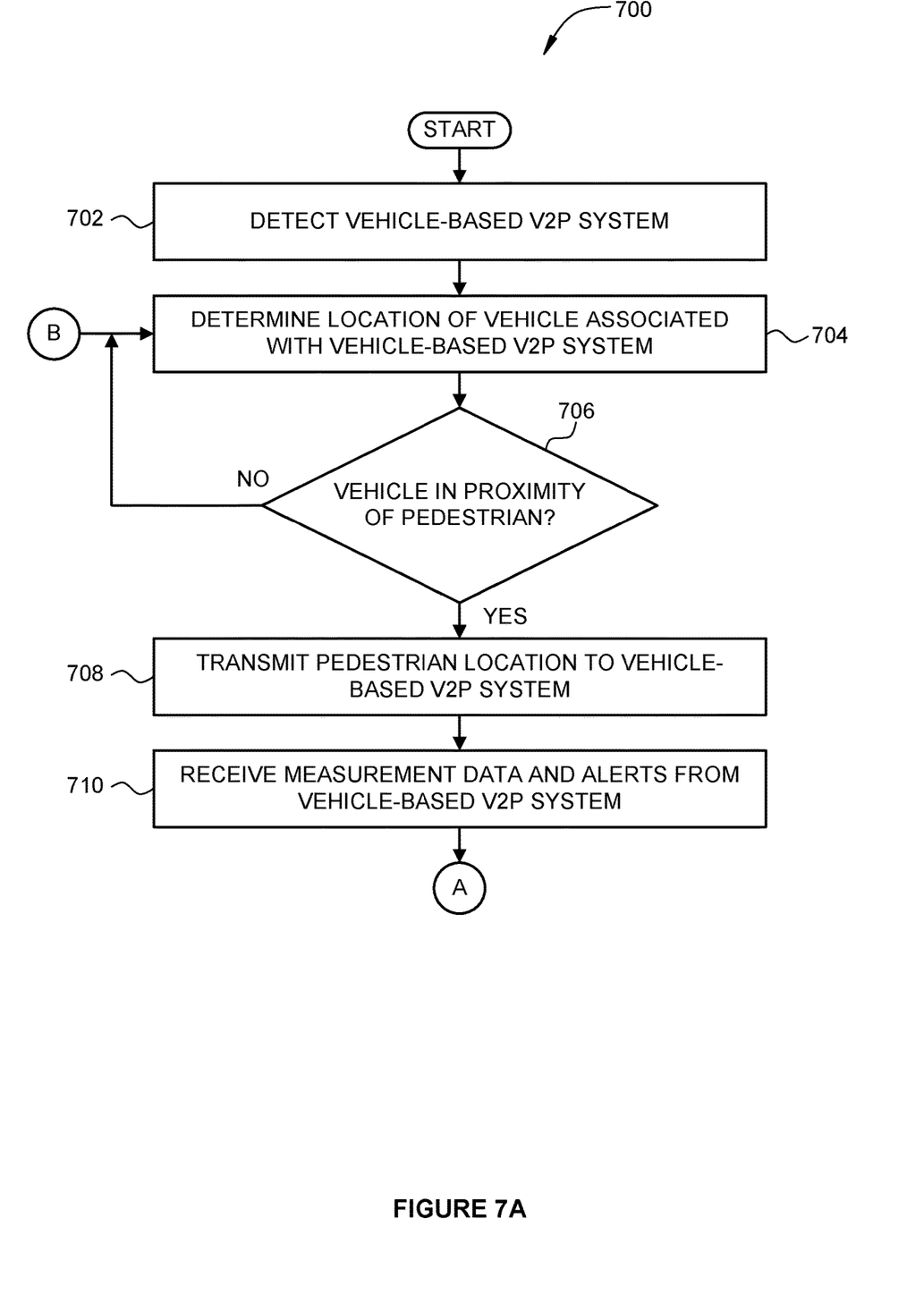
FIGS. 7A-7B set forth a flow diagram of method steps for generating, via a pedestrian based V2P system, an alert based on measurement data and alerts associated with monitoring of a driver received from a vehicle-based V2P system, according to various embodiments.
Figure 7B:
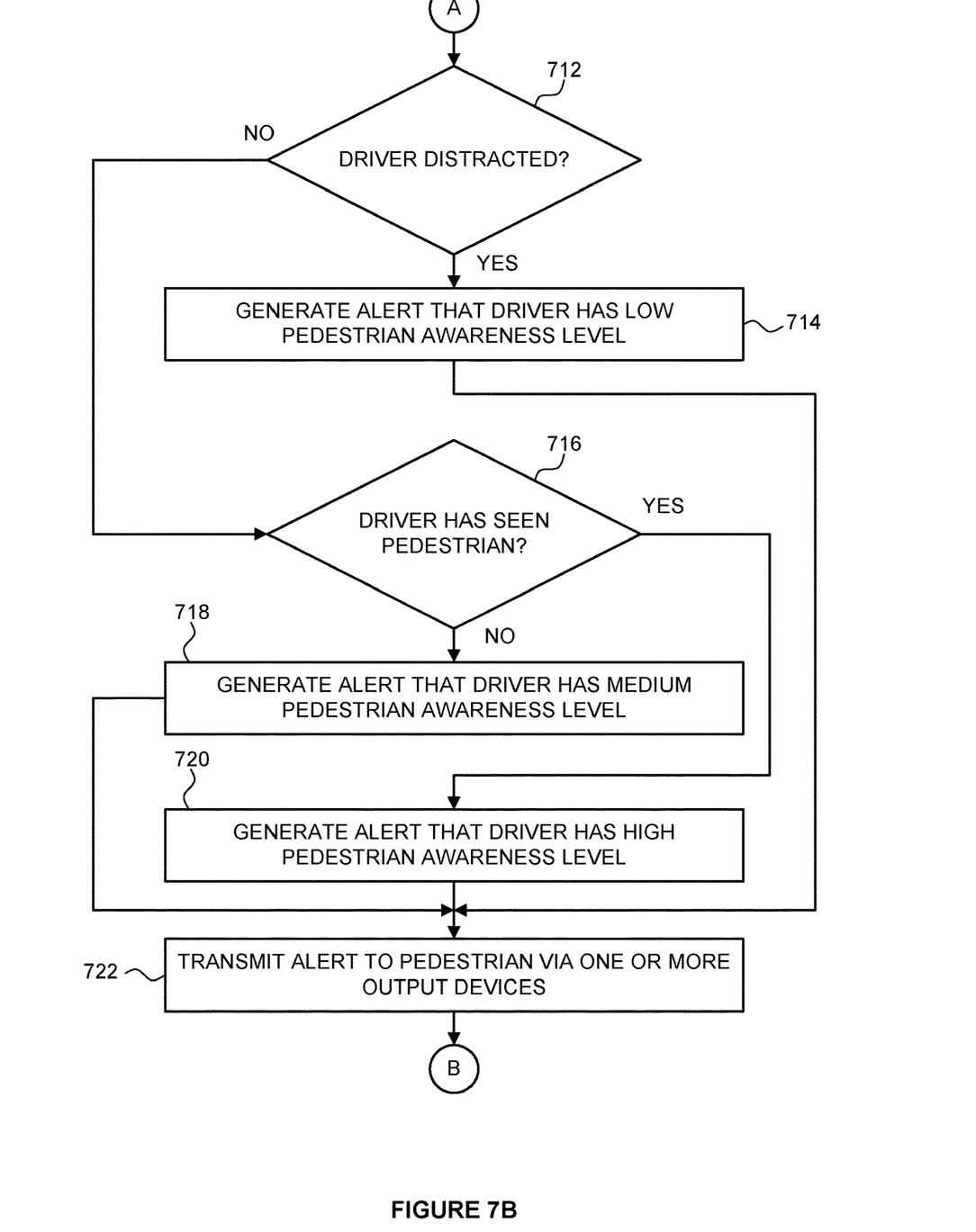

FIGS. 7A-7B set forth a flow diagram of method steps for generating, via a pedestrian based V2P system, an alert based on measurement data and alerts associated with monitoring of a driver received from a vehicle-based V2P system 114, according to various embodiments. Although the method steps are described in conjunction with the systems of FIGS. 1-5, persons skilled in the art will understand that any system configured to perform the method steps, in any order, is within the scope of the present disclosure.

As shown, a method 700 begins at step 702, where a pedestrian-based V2P system 124 detects a vehicle-based V2P system 114. At step 704, the pedestrian-based V2P system 124 determines the location of a vehicle 110 associated with the vehicle-based V2P system 114. The pedestrian-based V2P system 124 determines the location of a vehicle 110 based on measurement data received from sensors 404 included in the pedestrian-based V2P system 124. Additionally or alternatively, the pedestrian-based V2P system 124 determines the location of a vehicle 110 based on measurement data received from the vehicle-based V2P system 114. At step 706, the pedestrian-based V2P system 124 determines whether the vehicle 110 is in proximity of the pedestrian, based on the relative position of the vehicle 110 and the pedestrian 122. If the vehicle 110 is not in proximity of the pedestrian 122, then the method 700 proceeds to step 704, described above.

If, on the other hand, the vehicle 110 is in proximity of the pedestrian 122, then the method 700 proceeds to step 708, where the pedestrian-based V2P system 124 may optionally transmit the location of the pedestrian to the vehicle-based V2P system 114. At step 710, the pedestrian-based V2P system 124 receives measurement data and/or alerts related to the awareness level of the driver 112 from the vehicle-based V2P system 114. The data may include data specifying the awareness level of the driver 112, metrics that are determinative of the awareness level of the driver 112, raw measurement data from the internally facing sensors 116 and/or externally facing sensors 118, alerts in digitized audio or other suitable format to transmit to the pedestrian 122, and/or the like.

At step 712, the pedestrian-based V2P system 124 determines, based on the data received from the vehicle-based V2P system 114, whether the driver 112 is distracted. If the pedestrian-based V2P system 124 determines that the driver is distracted, then the method proceeds to step 714, where the pedestrian-based V2P system 124 generates an alert indicating that the driver 112 has a low awareness level of the pedestrian 122. If, at step 712, the pedestrian-based V2P system 124 determines that the driver is not distracted, then the method proceeds to step 716, where the pedestrian-based V2P system 124 determines, based on the data received from the vehicle-based V2P system 114, whether the driver 112 has seen the pedestrian 122. If the pedestrian-based V2P system 124 determines that the driver 112 has not seen the pedestrian 122, then the method proceeds to step 718, where the pedestrian-based V2P system 124 generates an alert indicating that the driver 112 has a medium awareness level of the pedestrian 122. If, at step 716, the pedestrian-based V2P system 124 determines that the driver 112 has seen the pedestrian 122, then the method proceeds to step 720, where the pedestrian-based V2P system 124 generates an alert indicating that the driver 112 has a high awareness level of the pedestrian 122.

From any of steps 714, 718, or 720, the method 700 proceeds to step 722, where the pedestrian-based V2P system 124 transmits the alert to the pedestrian 122 via one or more output devices, such as by using one or more of an audio output device, a haptic device, and/or a visual display. Then, the method proceeds to step 704, described above.

In some embodiments, the vehicle-based V2P system 114 may perform all, or substantially all, of the analysis of the measurement data from the internally facing sensors 116, the externally facing sensors 118, and location data received from the pedestrian-based V2P system 124. In such embodiments, the vehicle-based V2P system 114 may determine the types and number of alerts to generate, and generate the alerts. The vehicle-based V2P system 114 may transit the alerts to the pedestrian-based V2P system 124. The pedestrian-based V2P system 124 may perform little or no additional analysis before transmitting the alerts to one or more output devices associated with the pedestrian-based V2P system 124.

In sum, a pedestrian-based vehicle-to-pedestrian (V2P) system communicates with a vehicle-based V2P system. The pedestrian-based V2P system detects the presence of the vehicle-based V2P system and determines the location of the vehicle associated with the vehicle-based V2P system. If the vehicle is in proximity of the pedestrian, then the pedestrian-based V2P system transmits the location of the pedestrian to the vehicle-based V2P system. The pedestrian-based V2P system requests data associated with the driver state and intentions from the vehicle-based V2P system. This data may be determined via a driver monitoring system (DMS). Based on this data, the pedestrian-based V2P system determines whether the driver is distracted. If the driver is distracted, then the pedestrian-based V2P system generates a message indicating that the driver has a low pedestrian awareness level. If, on the other hand, the driver is not distracted, then the pedestrian-based V2P system determines whether the driver has seen the pedestrian. If the driver has not seen the pedestrian, then the pedestrian-based V2P system generates a message indicating that the driver has a medium pedestrian awareness level. If, on the other hand, the driver has seen the pedestrian, then the pedestrian-based V2P system generates a message indicating that the driver has a high pedestrian awareness level. After generating the appropriate message, the pedestrian-based V2P system transmits the message to the pedestrian via one or more output devices. The output devices may include audio speakers, haptic output devices, a visual image, and/or the like.

At least one technical advantage of the disclosed techniques relative to the prior art is that a pedestrian is proactively alerted to the awareness level of a driver. Different levels or types of alerts inform the pedestrian as to whether the driver has an actual awareness of the pedestrian, an awareness level of the driver, or a level of distraction of the driver. The pedestrian may then take an appropriate responsive action, such as waiting before crossing the road, attempting to get the attention of the driver, taking evasive action to avoid being hit by the vehicle of the driver, and/or the like. As a result, the disclosed techniques reduce the likelihood that a pedestrian is injured by a driver relative to prior approaches. These technical advantages represent one or more technological improvements over prior art approaches.

1. In some embodiments, a computer-implemented method for providing an alert, based on monitoring of a driver of a vehicle, via a pedestrian-based vehicle-to-person (V2P) system associated with a pedestrian, comprises: receiving, from a vehicle-based V2P system, data related to an awareness level of the driver of the vehicle; generating an alert based on at least one of a location of the vehicle and the awareness level of the driver of the vehicle; and transmitting the alert to an output device.

2. The computer-implemented method according to clause 1, wherein generating the alert comprises: determining, based on the data related to the awareness level of the driver of the vehicle, that the driver is distracted; and generating the alert indicating that the driver has a low pedestrian awareness level.

3. The computer-implemented method according to clause 1 or clause 2, wherein determining that the driver is distracted comprises determining that the data related to the awareness level of the driver of the vehicle indicates that the driver is fatigued.

4. The computer-implemented method according to any of clauses 1-3, wherein determining that the driver is distracted comprises determining that the data related to the awareness level of the driver of the vehicle indicates that the driver is engaging in a distracting behavior.

5. The computer-implemented method according to any of clauses 1-4, wherein generating the alert comprises: determining, based on the data related to the awareness level of the driver of the vehicle, that the driver is not distracted; determining, based on the data related to the awareness level of the driver of the vehicle, that the driver has not seen the pedestrian; and generating the alert indicating that the driver has a medium pedestrian awareness level.

6. The computer-implemented method according to any of clauses 1-5, wherein generating the alert comprises: determining, based on the data related to the awareness level of the driver of the vehicle, that the driver has seen the pedestrian; and generating the alert indicating that the driver has a high pedestrian awareness level.

7. The computer-implemented method according to any of clauses 1-6, wherein determining that the driver has seen the pedestrian comprises determining that an eye gaze direction, included in the data related to the awareness level of the driver of the vehicle, intersects with a location of the pedestrian.

8. The computer-implemented method according to any of clauses 1-7, wherein the data related to the awareness level of the driver of the vehicle includes the alert, and wherein generating the alert comprises extracting the alert from the data.

9. The computer-implemented method according to any of clauses 1-8, further comprising transmitting a location of the pedestrian to the vehicle, wherein the data related to the awareness level of the driver of the vehicle is based on the location of the pedestrian.

10. In some embodiments, one or more non-transitory computer-readable media store program instructions that, when executed by one or more processors, cause the one or more processors to perform steps of: receiving, from a vehicle-based V2P system, data related to an awareness level of a driver of a vehicle; generating an alert based on at least one of a location of the vehicle and the awareness level of the driver of the vehicle; and transmitting the alert to an output device of a pedestrian.

11. The one or more non-transitory computer-readable media according to clause 10, wherein generating the alert comprises: determining, based on the data related to the awareness level of the driver of the vehicle, that the driver is distracted; and generating the alert indicating that the driver has a low pedestrian awareness level.

12. The one or more non-transitory computer-readable media according to clause 10 or clause 11, wherein determining that the driver is distracted comprises determining that the data related to the awareness level of the driver of the vehicle indicates that the driver is fatigued.

13. The one or more non-transitory computer-readable media according to any of clauses 10-12, wherein determining that the driver is distracted comprises determining that the data related to the awareness level of the driver of the vehicle indicates that the driver is engaging in a distracting behavior.

14. The one or more non-transitory computer-readable media according to any of clauses 10-13, wherein generating the alert comprises: determining, based on the data related to the awareness level of the driver of the vehicle, that the driver is not distracted; determining, based on the data related to the awareness level of the driver of the vehicle, that the driver has not seen the pedestrian; and generating the alert indicating that the driver has a medium pedestrian awareness level.

15. The one or more non-transitory computer-readable media according to any of clauses 10-14, wherein generating the alert comprises: determining, based on the data related to the awareness level of the driver of the vehicle, that the driver has seen the pedestrian; and generating the alert indicating that the driver has a high pedestrian awareness level.

16. The one or more non-transitory computer-readable media according to any of clauses 10-15, wherein determining that the driver has seen the pedestrian comprises determining that an eye gaze direction, included in the data related to the awareness level of the driver of the vehicle, intersects with a location of the pedestrian.

17. The one or more non-transitory computer-readable media according to any of clauses 10-16, wherein the data related to the awareness level of the driver of the vehicle includes the alert, and wherein generating the alert comprises extracting the alert from the data.

18. The one or more non-transitory computer-readable media according to any of clauses 10-17, wherein the program instructions, when executed by the one or more processors, cause the one or more processors to perform the step of transmitting a location of the pedestrian to the vehicle, wherein the data related to the awareness level of the driver of the vehicle is based on the location of the pedestrian.

19. In some embodiments, a system comprises: one or more memories storing instructions; and one or more processors coupled to the one or more memories and, when executing the instructions: receive, from a vehicle-based V2P system, data related to an awareness level of a driver of a vehicle; generate an alert based on at least one of a location of the vehicle and the awareness level of the driver of the vehicle; and transmit the alert to an output device of a pedestrian.

20. The system according to clause 19, wherein the one or more processors, when executing the instructions, further transmits a location of the pedestrian to the vehicle, wherein the data related to the awareness level of the driver of the vehicle is based on the location of the pedestrian.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for providing an alert, based on monitoring of a driver of a vehicle, via a pedestrian-based vehicle-to-person (V2P) system associated with a pedestrian, the method comprising:

receiving, by the pedestrian-based V2P system from a vehicle-based V2P system, eye measurement data related to an awareness the driver of the vehicle has of the pedestrian;

determining, by the pedestrian-based V2P system based on the eye measurement data, whether the driver has seen the pedestrian;

generating, by the pedestrian-based V2P system, an alert based on the determination of whether the driver has seen the pedestrian; and transmitting, by the pedestrian-based V2P system, the alert to an output device of the pedestrian.

2. The computer-implemented method of claim 1, wherein the step of generating the alert comprises:

determining, based on a set of additional data, that the driver is distracted; and generating the alert indicating that the driver has a low pedestrian awareness level.

3. The computer-implemented method of claim 2, wherein the step of determining that the driver is distracted comprises determining that the set of additional data indicates that the driver is fatigued.

4. The computer-implemented method of claim 2, wherein the step of determining that the driver is distracted comprises determining that the set of additional data indicates that the driver is engaging in a distracting behavior.

5. The computer-implemented method of claim 1, wherein the step of generating the alert comprises:

determining, based on a set of additional data, that the driver is not distracted;

determining, based on the eye measurement data, that the driver has not seen the pedestrian; and generating the alert indicating that the driver has a medium pedestrian awareness level.

6. The computer-implemented method of claim 1, wherein the step of generating the alert comprises:

determining, based on the eye measurement data that the driver has seen the pedestrian; and generating the alert indicating that the driver has a high pedestrian awareness level.

7. The computer-implemented method of claim 6, wherein the step of determining that the driver has seen the pedestrian comprises determining that an eye gaze direction included in the eye measurement data, intersects with a location of the pedestrian.

8. The computer-implemented method of claim 1, wherein:

a set of additional data includes the alert, and the step of generating the alert comprises extracting the alert from the set of additional data.

9. The computer-implemented method of claim 1, further comprising transmitting, by the pedestrian-based V2P system, a location of the pedestrian to the vehicle, wherein an additional set of data transmitted by the vehicle-based V2P system is based on the location of the pedestrian.

10. One or more non-transitory computer-readable media storing program instructions that, when executed by one or more processors of a pedestrian-based vehicle-to-person (V2P) system, cause the one or more processors to perform steps of:

receiving, by the pedestrian-based V2P system from a vehicle-based V2P system, eye measurement data related to an awareness of a driver of a vehicle has of a pedestrian;

determining, by the pedestrian-based V2P system based on the eye measurement data, whether the driver has seen the pedestrian;

generating, by the pedestrian-based V2P system, an alert based on the determination of whether the driver has seen the pedestrian; and transmitting, by the pedestrian-based V2P system, the alert to an output device of the pedestrian.

11. The one or more non-transitory computer-readable media of claim 10, wherein the step of generating the alert comprises:

determining, based on a set of additional data, that the driver is distracted; and generating the alert indicating that the driver has a low pedestrian awareness level.

12. The one or more non-transitory computer-readable media of claim 11, wherein the step of determining that the driver is distracted comprises determining that the set of additional data indicates that the driver is fatigued.

13. The one or more non-transitory computer-readable media of claim 11, wherein the step of determining that the driver is distracted comprises determining that the set of additional data indicates that the driver is engaging in a distracting behavior.

14. The one or more non-transitory computer-readable media of claim 10, wherein the step of generating the alert comprises:

determining, based on a set of additional data, that the driver is not distracted;

determining, based on the eye measurement data, that the driver has not seen the pedestrian; and generating the alert indicating that the driver has a medium pedestrian awareness level.

15. The one or more non-transitory computer-readable media of claim 10, wherein the step of generating the alert comprises:

determining, based on the eye measurement data that the driver has seen the pedestrian; and generating the alert indicating that the driver has a high pedestrian awareness level.

16. The one or more non-transitory computer-readable media of claim 15, wherein the step of determining that the driver has seen the pedestrian comprises determining that an eye gaze direction included in the eye measurement data, intersects with a location of the pedestrian.

17. The one or more non-transitory computer-readable media of claim 10, wherein:

a set of additional data includes the alert, and the step of generating the alert comprises extracting the alert from the set of additional data.

18. The one or more non-transitory computer-readable media of claim 10, further comprising instructions that, when executed by the one or more processors, cause the one or more processors to perform the step of transmitting a location of the pedestrian to the vehicle, wherein an additional set of data transmitted by the vehicle-based V2P system is based on the location of the pedestrian.

19. A pedestrian-based vehicle-to-person(V2P) system, comprising:

one or more memories storing instructions; and one or more processors coupled to the one or more memories and, when executing the instructions:

receive, from a vehicle-based V2P system, eye measurement data related to an awareness a driver of a vehicle has of a pedestrian;

determine, based on the eye measurement data, whether the driver has seen the pedestrian;

generate an alert based on the determination of whether the driver has seen the pedestrian; and transmit the alert to an output device of the pedestrian.

20. The system of claim 19, wherein the one or more processors, when executing the instructions, further transmits a location of the pedestrian to the vehicle, wherein an additional set of data transmitted by the vehicle-based V2P system is based on the location of the pedestrian.

* * * * *

UNITED STATES PATENT AND TRADEMARK OFFICE
CERTIFICATE OF CORRECTION

| | | |
|---|---|---|
| PATENT NO. | : 11,518,305 B2 | Page 1 of 1 |
| APPLICATION NO. | : 17/066431 | |
| DATED | : December 6, 2022 | |
| INVENTOR(S) | : Evgeny Burmistrov et al. | |

It is certified that error appears in the above-identified patent and that said Letters Patent is hereby corrected as shown below:

In the Claims

Column 18, Claim 10, Line 63, please delete "of" after awareness.

Signed and Sealed this
Seventh Day of February, 2023

Katherine Kelly Vidal
*Director of the United States Patent and Trademark Office*